United States Patent [19]

Ozin et al.

[11] Patent Number: 4,942,119
[45] Date of Patent: Jul. 17, 1990

[54] PHOTOSENSITIVE, RADIATION SENSITIVE, THERMALLY SENSITIVE AND PRESSURE SENSITIVE SILVER SODALITE MATERIALS

[76] Inventors: Geoffrey A. Ozin, 63 Gormerly Avenue, Toronto, Ontario, Canada, M4V 1Y9; John Godber, 179 Mavety Street, Toronto, Ontario, Canada, M6P 2M1; Andreas Stein, 286 Perth Avenue, Toronto, Ontario, Canada, M6P 3Y2

[21] Appl. No.: 227,939

[22] Filed: Aug. 3, 1988

[51] Int. Cl.$^5$ .................................................. G03C 1/02
[52] U.S. Cl. ..................................... 430/564; 430/495; 430/541; 430/567; 430/617; 430/618; 430/962; 423/328
[58] Field of Search ............... 430/567, 617, 618, 564, 430/541, 495, 962; 423/328 C, 328 E, 328 T

[56] References Cited

U.S. PATENT DOCUMENTS 2,678,885  5/1954  Porter .................................. 423/328
3,013,985  12/1961  Breck et al. ................. 423/328 E X
3,382,039  5/1968  Calmon et al. ...................... 423/118
3,508,867  4/1970  Frilette et al. ............. 423/328 E X

OTHER PUBLICATIONS

Williams et al., "J. American Ceramic Society", vol. 52, No. 3, 1969, pp. 139–145.

Primary Examiner—Paul R. Michl
Assistant Examiner—Janet C. Baxter
Attorney, Agent, or Firm—Nixon & Vanderhye

[57] ABSTRACT

Silver sodalites with cages containing anions such as oxalate, formate, halide, carbonate, sulphide etc. have silver compositions entrapped or encapsulated in the cages of a microporous sodalite lattice. The cages of the sodalite lattice have very small but very even sizes e.g. 6.6 A diameters, so that the silver compositions trapped therein are also of very small but very even sizes. The silver compositions may be sensitive to the application of light, and may be sensitive to thermal or pressure stimuli. Thus, images produced by, for example, irradiation of the materials can be of very high resolution. The silver sodalite materials are prepared by a silver ion exchange process, from synthetic sodium sodalites.

17 Claims, 3 Drawing Sheets

⊘ SI, AI
○ O

PHOTOSENSITIVE, RADIATION SENSITIVE, THERMALLY SENSITIVE AND PRESSURE SENSITIVE SILVER SODALITE MATERIALS

FIELD OF THE INVENTION

This invention relates to novel compositions of matter useful as data recording media, and processes for their preparation. More particularly the invention relates to silver sodalites, their preparation and uses.

BACKGROUND OF THE INVENTION

Sodalites are known materials, both natural and synthetic. They are generally aluminosilicate framework materials, composed of close-packed truncated octahedral cages, with the unit cell composition $M_8(AlSiO_4)_6X_2$, where M is a cation and X is an anion. In some instances the aluminum and silicon are replaced by elements such as gallium, beryllium and germanium. The archetype sodalite is sodium chloro-sodalite. Sodalites are characterized by a lattice structure consisting of a cage of twelve tetrahedral $AlO_5^{5-}$ or similar units and twelve $SiO_4^{4-}$ or similar units linked together by oxygen bridges in an alternating pattern to form a truncated octahedron with eight single 6-ring openings and six single 4-rings. This single sodalite cage is diagrammatically represented in FIG. 1 of the accompanying drawings. Typically, the cage has a diameter of 6.6 Å and the diameters of the hexagonal and four-ring openings are 2.2–2.6 Å and 1.5–1.6 Å respectively, according to literature reports. Sodalite cages or $\beta$-cages are "tertiary building units" of many zeolites.

Because of the valence difference between aluminum and silicon, the lattice possesses a negative charge equal to the number of aluminum atoms. Large electrostatic potentials are therefore present within the pore system. Resulting from their processes of manufacture, sodalites commonly have an anion trapped in the cage. Thus in sodium chloro-sodalite, a chloride ion occupies the center of each cubo-octahedron. The resulting charge is balanced by four structurally equivalent, tetrahedrally disposed sodium ions, which are coordinated to three framework oxygens of a hexagonal ring and the central anion. The individual $\beta$-cages are stacked in eight fold coordination (body centred cubic) so that a given centrally created $\beta$-cages shares a hexagonal ring with each of eight adjacent $\beta$-cages (an all space filling Federov solid).

A large variety of naturally occurring minerals with diverse compositions are classified as members of the sodalite family. Examples include sodalite $Na_8[(AlO_2)_6(SiO_2)_6]9\ Cl_2$; noselite $Na_8[(AlO_2)_6(SiO_2)_6]SO_4$; hauynite $Na_{5-8}Ca_{0-2}K_{0-1}[(AlO_2)_6(SiO_2)_6](SO_4)_{1-2}$; lapis lazuli $(Na_2Ca)_4[(AlO_2)_6(SiO_2)_6](SO_4,S,Cl_2)_2$; and danalite $Fe_8[(BeO_2)_6(SiO_2)_6]S_2$.

A wide range of anions and cations have been incorporated in synthetic sodalites as encapsulated (so called "packaged") salts. In addition to halides, the anions include hydroxide, cyanide, thiocyanate, perchlorate, bromate, nitrate, azide, sulfite, sulfate, phosphate, manganate, selenite and the like. In addition to alkali metals, the cations include rubidium, silver, tellurium, ammonium, calcium, strontium, lead, zinc, manganese, cadmium etc. Anions such as halides are too large to move through the openings of the sodalite cages and remain trapped therein. Smaller cations can move in and out of the sodalite cages, through the 6-ring openings therein.

The flexibility in sodalite composition allows control not only over lattice charge but also over lattice dimensions. The close packing of $\beta$-cages with small openings results in a temperature stable matrix with a uniform pore size distribution that can stabilize small isolated molecules, atoms, ions and radicals which may be air-sensitive or reactive otherwise. Under normal conditions of temperature and pressure the access to the interior of the sodalite framework is restricted for most molecules. It is however possible to carry out chemical reactions within the host-lattice. The trapped species can be studied by appropriate physico-chemical methods.

DESCRIPTION OF THE PRIOR ART

It is known to prepare photochromic and cathodochromic sodalites. These are commonly halosystems doped with small amount of sulfide as sensitizer. Sulfur-doped bromosodalite, for example, has been widely studied as a cathodochromic material for use in dark trace cathode ray tubes. It changes color from white to purple when excited by an electron beam or UV light. Manganese, iron, cobalt, nickel and chromium have also been investigated (as sensitizers) in synthetic photochromic and cathodochromic sodalites (see references 1–5). Electrons trapped at anion vacancies (F-centers) are believed responsible for the chromic properties of photochromic and cathodochromic sodalites. Japanese patent specification SHO-61-61894 YOKONO et al describes an optical recording medium consisting of a silver halide and a large pore zeolite compound. It is prepared by heating a mixture of silver halide with zeolite. When the material is exposed to light, it darkens in color. When the darkened material is subsequently heated, it fades back to its original color. The coloration and heating cycle is repeatable.

SUMMARY OF THE INVENTION

It is an object of the present invention to provide novel sodalite materials.

It is a further object of the present invention to provide an optical recording medium in which the radiation sensitive constituent is a sodalite material.

The present invention provides silver sodalite compositions in which silver compositions are trapped or encapsulated in the B-cages of a microporous sodalite lattice. The cages of the sodalite lattice have very small but very even sizes, e.g. 6.6. Å diameters. Accordingly, the silver compositions trapped therein are also of very small but very even sizes. The silver compositions may be sensitive to the application of light, and may be sensitive to thermal or pressure stimuli. Images produced by irradiation of the materials may be of very high resolution, possibly greatly exceeding the limitations of the conventional photographic process, which has a minimum grain size of about 1 micron. The silver sodalites have the ability to create silver clusters, encapsulated, immobile, stabilized, intrinsically homogeneously dispersed in the uniform distribution of space-filling 6.6 Å cubo-octahedral cavities of the sodalite framework.

BRIEF DESCRIPTION OF THE DRAWINGS

Embodiments of the present invention will be described with reference to the attached drawings, in which.

DESCRIPTION OF THE PREFERRED EMBODIMENTS

Figure 1:
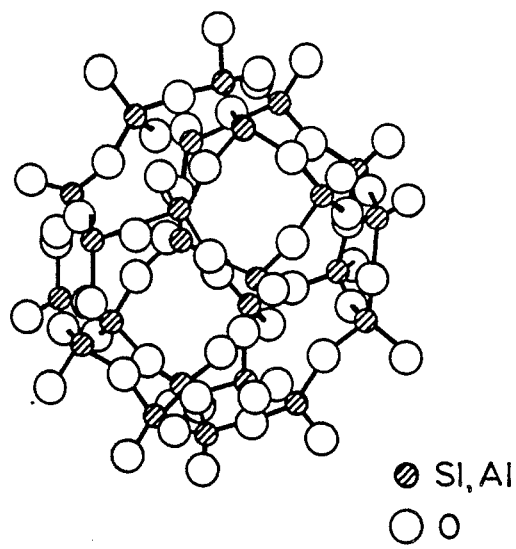
FIG. 1 is a diagrammatic representation of a single sodalite cage.

One type of preferred silver sodalite of the present invention has an anion associated with the silver and disposed within the silver sodalite cage. The nature of the anion controls the intra-beta cage chemistry, through its redox potential, photochemistry and the like. Each anion can thus confer individual and different properties such as radiation response on the final sodalite materials. When an anion bearing a single charge, e.g. $I^-$, is chosen, every cage of the sodalite contains one anion. When a divalent anion is chosen, such as $S^{2-}$, every second sodalite cavity is devoid of an anion. When a trivalent anion is chosen, such as $PO_4^{3-}$, ever third sodalite cavity is devoid of an anion. In this, and in other ways, the anion controls the intra-beta cage chemistry.

Substantially any anion which has previously been incorporated as a constituent of synthetic sodalite can be used in the present invention, each conferring its own individual characteristics on the resultant product. Preferred anions include oxalate, chloride, bromide, iodide, hydroxide, azide, carbonate, bicarbonate, sulfuroxy anions, chlorate, perchlorate, acetate and formate. Combinations of two or more such anions can also be used. Most preferred such anions are the carbon-containing anions, namely oxalate, formate, carbonate and bicarbonate, with the organic anions oxalate and formate being especially preferred.

Another interesting and preferred silver sodalite according to the invention has only cations of silver or silver and sodium in the cages, and no anions therein. Such materials can be prepared from sodium sodalites, especially sodium hydroxy sodalites, by Soxhlet extraction with water to remove the anions and some cations therefrom. Effectively one sodium cation is removed from each cage along with the anion, leaving three cations available for exchange with silver. In fact any number of silver cations up to $Ag^{8+}$ can be entered into the cage, with appropriate charge balancing, the interior of the cages remaining free of anions. Such silver sodalites Ag-SOD are most useful as precursors in preparing other silver sodalite materials, with small redoxactive guest groups entering the cages along with the silver cations.

The preferred silver sodalites are suitably prepared by silver exchange processes of synthetic sodium sodalites. Methods of synthesis of sodalites are well known and reported in the literature. They can be classified into three general types, namely solid state synthesis (sintering), solid state decompositions or structure conversion method, and hydrothermal synthesis (references 6, 7, and 8). The Si:Al ratios in the products can be adjusted during their preparation. For present purposes, it is preferred to prepare the sodium sodalite either by using a mixture of aluminate and silicate with crystallization of the product from the gel or by the low temperature hydrothermal transformation of kaolinite, using an aqueous solution of a sodium salt in alkaline conditions. The choice of sodium salt determines the anion in the resulting sodium sodalite. Silver is exchanged for the sodium of the sodalites by an ion exchange process, to prepare the materials of the present invention. The anion of the sodium sodalite remains in place in the silver sodalite. The diameter of the six-ring openings of the sodalite structure is sufficient for small cations such as $Na^+$ and $Ag^+$ and small molecules such as ammonia and water to pass through.

Accordingly, silver sodalites may be prepared by a solid state melt exchange process, in which a sodium sodalite is intimately mixed with silver nitrate and heated under vacuum, in the dark. The resultant product is filtered, washed and dried. An aqueous exchange may also be used, in which the sodium sodalite is added to an aqueous solution containing excess silver nitrate at room temperature or under reflux, followed by filtering, washing and drying, all steps taking place in the dark. The retention of the crystalline sodalite structure in the exchanged product can be confirmed by X-ray powder diffraction analysis.

The silver sodalites of the present invention may be partially exchanged or fully exchanged. In a partially exchanged sodalite some of the original cation, normally sodium, remains in the sodalite with the silver, whereas in a fully exchanged sodalite, all the original sodium is replaced with silver.

The silver sodalite materials of the invention exhibit thermochromic responses, in that they darken or change color to various extents on heating. The temperature at which the color changes, varies according to the type of silver sodalite as well as the environment in which the material is heated. It is normally within the range of 100°–450° C.

Silver oxalato-sodalite compositions are particularly interesting in this respect. The initial color of such compositions depends on the thermal history and silver concentration and can range from white, through green, orange, brown, and grey.

The materials of the invention also exhibit photochromic behavior as indicated by color changes upon irradiation with UV or visible light from a xenon lamp or argon laser. Photolytic processes appear to be responsible for these changes, in many instances, perhaps in combination with thermal effects induced by local heating. For example, when a disk of Ag,Cl-SOD or Ag,Br-SOD is irradiated with UV-laser light, a light orange spot is formed, whereas Ag,I-SOD turns brown where the laser beam strikes but turns yellow on further irradiation. Sulfide-containing sodalite samples turn brown or black. Silver oxalato-sodalites may be initially of different colors depending upon the method of their preparation (white when prepared by aqueous ion exchange and green when prepared by melt exchange), but in both cases, a yellow color is formed upon irradiation, with high spacial resolution, for example using a focussed laser beam. With respect to silver carbonato, hydroxy, and to a lesser degree formatosodalites the photochromic behavior is intensity dependent. The starting materials are white and in regions of low irradiation intensity turn grey, whilst in areas where a certain threshold intensity is exceeded the grey spot is bleached to a lighter grey (hydroxide, formate) or yellow (carbonate). The bleached areas cannot be re-marked. Accordingly, for applications in an imaging system, these silver sodalites can be used to create both a positive image by writing with low intensity laser light or a negative image by writing with a high intensity beam and then developing the remaining area with lower intensity radiation.

The materials of the invention also exhibit barochromic behavior, in that they darken or change color in response to various extents on the application of pressure. Most sensitive in this respect are the silver hydroxy sodalites (Ag,OH-SOD) and silver formato sodalites (Ag,Fo-SOD). Regarding the silver hydroxy sodalites, it has also been discovered that both the hydrated and dehydrated forms of this sodalite exhibit a barochromic response. The pressure at which the color changes is usually in the range of 100–200 MPa. X-ray diffraction and Fourier transform infra-red studies indicate that the sodalite framework, after exposure to pressure, is intact.

Although not wishing to be bound by any particular theory, it is believed that, in all instances color change is associated with the reduction of silver ions to zero or low valent metallic silver. The metallic silver forms small clusters, constrained by the size of the sodalite cavity in which the silver is contained. In practice, the sodalite cage permits the formation of $Ag_4$, a cluster size which is known to be desirable for photographic purposes, the catalyst in the formation of the conventional photographic latent image. Reduced silver is more bulky than ionic silver, so that, once reduced, the encaged silver aggregate is even less likely to migrate relative to the sodalite framework.

Silver oxalato-sodalites are particularly interesting materials according to the invention because they allow the possibility of internal silver reduction by controlled, intentional decomposition of the trapped oxalate ions. Oxalates decompose on photolytic treatment to generate carbon dioxide and free electrons available for reduction, thus active to reduce the encapsulated silver ions present to the metal cluster form. On thermal decomposition, electrons are also generated along with carbon dioxide, effective in reduction of silver. The oxalate stability is directly related to the silver concentration. It has not previously been attractive to realize the potential of silver oxalate as a photographic recording medium, despite its apparently attractive photolytic decomposition pathway as outlined above, because silver oxalate is liable to explode on heating. When it is used in association with a sodalite in accordance with the present invention, its explosive tendencies are no longer a problem. Moreover, it is easier to handle, and is non-poisonous in its sodalite form.

The silver oxalato-sodalites of the present invention also exhibit fluorescence with different colors or intensities, depending on the silver concentration and pretreatment. Such materials made by melt synthesis, or after thermal photoactivation exhibit immediate fluorescence. Samples prepared by aqueous exchange do not fluoresce when synthesized, but very short exposure to ultraviolet radiation (e.g. 10 seconds exposure under a short wave UV-254nm black light) activates the fluorescence. This fluorescence behavior especially in samples with low silver concentrations (e.g. 0.5 $Ag^+$ per unit cell) is useful in multiple write and erase applications. Samples activated under a black light fluoresce with an orange color. Upon brief exposure (e.g. 1 second) to a 351.1 nm UV-laser beam the originally white samples are only slightly discolored on the exposed areas but the orange fluorescence is quenched. Accordingly, in a writing cycle, marks are produced on the sodalite bearing medium, in the form of dark non-fluorescing areas on an orange fluorescing background. In the erase cycle, the marked samples are heated at 80°–100° C., a temperature at which the oxalate does not decompose. This treatment causes the traces to fade slowly. The process of laser marking and thermal erasure can be repeated on the same area several times. The presence of residual oxalate ion appears to be necessary for this repeated writing and erasing and eventual depletion of the oxalate will render the material no longer useful.

As noted previously, several of the silver sodalites according to the present invention lend themselves to applications in high density imaging and optical data storage. The silver sodalites marked by light or heat may be usable in write-once-only optical data storage where the presence or absence of a mark defines the binary state of each data point. Since the regular close packed framework structure contains $\beta$-cages with 6.6 Å diameters, which can potentially trap and stabilize clusters formed inside, very high resolution images can be formed on sodalites, the point sizes of which are limited mainly by the sodalite crystallite size and the writing mechanism employed. Silver oxalato-sodalites with low silver concentrations, less than 8 $Ag^+$ per unit cell, i.e. containing some residual sodium, are useful materials that allow multiple write-and-erase cycles. Its luminescence properties can be tuned by adjusting the silver concentration or applying various pre-treatments. The broad bandwidth and brightness of the emission allows easy detection by a reading system. The nature of the anion controls the image stability to some extent.

Silver sodalites can be formed readily into self supporting discs, or embedded in a matrix, for example, a polymer matrix. As sodalites are temperature stable solids, ceramics technology may be applied to the processing of these materials. For certain applications of silver sodalites as optical materials, it may be necessary to support the sodalite in a binding matrix, or to fabricate the sodalite as a thin film on a suitable substrate.

Aspects of the present invention are specifically illustrated in the following non limiting specific examples.

EXAMPLE 1

Sodium-sodalites ready for exchange to form silver-sodalites were synthesized by low temperature hydrothermal transformations of kaolinite following the method of Barrer et al (reference 8). In a typical procedure, 8 g of kaolinite were added to 800 mL of a 4M NaOH aqueous solution containing an excess of the sodium salt to be incorporated in the sodalite framework. For preparation of sodium oxalate-sodalite, less than an excess of sodium oxalate was used, because the relative low solubility of the salt limits the equilibrium concentration of the oxalate.

The mixture was heated to 90° C. for 50 hours in a 1000 mL capped teflon bottle immersed in water bath, without stirring. The products were filtered through ASTM 10-15 medium pore glass frits. This pore size allowed untreated kaolinite particles to pass through while retaining the sodalite crystallites. The products were washed with about 2 L of hot deionized water and dried in air. The sodium sodalites were generally white.

The sodium sodalite structure was confirmed by X-ray powder diffraction and Fourier Transform mid and far infrared (IR) spectroscopy.

EXAMPLE 2

In an alternate procedure, sodium sodalites were prepared as follows. 5.1 g of aluminum hydroxide was weighed into a 1 L teflon bottle, after which 127 g of sodium hydroxide and 250 mL of deionized water were then added to the teflon bottle. After allowing the aluminum hydroxide to dissolve, an excess of the sodium salt to be incorporated in the sodalite framework was added to the teflon bottle. Approximately 550 mL of deionized water was then added to the teflon bottle after which the mixture contained therein was shaken vigorously. Approximately 9.7 g of silica sol (40.6% silica by weight stabilized with sodium hydroxide; available commercially as Ludox 40) was then added to the teflon bottle, followed by rapid mixing to form the gel (ratio silicon:aluminum is 1:1). The mixture was heated to 90° C. for 50 hours in a 1000 mL capped teflon bottle immersed in water bath without stirring. The product was filtered through an ASTM N-15 medium pore glass frit. The product was then washed with about 2 L of hot, deionized water and dried in air. The sodium sodalites prepared in this way were generally white in appearance.

The sodium sodalite structure was confirmed by X-ray powder diffraction and Fourier Transform mid and far infrared (IR) spectroscopy.

EXAMPLE 3

Silver sodalites were prepared from the sodium sodalites produced according to Examples 1 and 2, by one of two procedures. The first procedure was a solid melt exchange. Typically 1-2 g of sodium sodalite were intimately mixed with silver nitrate in a porcelain mortar. For complete exchange of sodium With silver, a slight excess of silver nitrate was used. For partial silver exchanges, stoichiometric amounts were used. The mixture was heated to 230° C. under vacuum for 20 hours inside a darkened pyrex tube. The product was filtered in the dark through a medium pore glass frit, washed with about 2 L of deionized water and dried in air.

The second procedure was an aqueous exchange and was found useful for the sodium hydroxide, oxalate and formate sodalites. Sodium sodalite was added to an aqueous solution containing excess silver nitrate. The mixture was stirred in the dark for about 24 hours at room temperature, or under reflux. The product was filtered, washed in the dark, and dried in air.

All silver sodalites were stored in dark sample vials.

Product crystalline structure was confirmed by X-ray powder diffraction and Fourier Transform mid and far IR spectroscopy.

By these procedures, the following silver sodalites were prepared:
Silver chloride sodalite (Ag,Cl-SOD)
Silver bromide sodalite (Ag,Br-SOD)
Silver iodide sodalite (Ag,I-SOD)
Silver sulfide sodalite (Ag,S-SOD)
Sulfur-doped silver bromide sodalite (Ag,Br,S-SOD)
Silver hydroxide sodalite (Ag,OH-SOD)
Silver sodalite (Ag$_6$-SOD)
Silver carbonate sodalite (Ag,CO$_3$-SOD)
Silver formate sodalite (Ag,HCO$_2$-SOD or Ag,Fo-SOD)
Silver oxalato sodalite (Ag,C$_2$O$_4$-SOD or Ag,Ox-SOD)
Silver perchlorate sodalite (Ag,ClO$_4$-SOD)
Silver sulfate/sulfite sodalite (Ag, SO$_x$-SOD)

Mixed sodium-silver and mixed anion sodalites to study silver concentration effects were also prepared.

EXAMPLE 4

Media of silver sodalites for optical recording purposes were prepared by embedding the sodalites in a poly (methylmethacrylate) matrix. A solution of 1.3 g poly (methylmethacrylate) in 8.5 mL of toluene was stirred at room temperature until all the polymer had dissolved. About 0.1 g silver sodalite, ground and sieved to less than 103 microns particle size, was added and the mixture was stirred to achieve a uniform sodalite distribution. A thin film of this mixture was applied on a fused silica disc (about 1 drop per cm$^2$) and was allowed to dry and cure at room temperature for at least 24 hours. Photo responses of the silver sodalites were tested on samples in this format, as described below in Example 8.

EXAMPLE 5

The photochromic behavior was studied by observing color changes upon irradiation with UV or visible light from a Xe-lamp or Ar$^+$-laser. Photo processes were observed for several samples. When a disk of Ag,Cl-SOD or Ag,Br-SOD was irradiated with UV-laser light, a light orange spot was formed, with little contrast from the background. Ag,I-SOD turned brown where the laser beam struck the disk, but a yellow spot was formed on further irradiation. Sulfide-containing samples turned brown or black. Silver oxalato-sodalites were white when prepared by aqueous ion exchange and green by melt exchange. In both cases a yellow spot was formed upon irradiation. None of the pure sodium sodalites changed color upon laser irradiation.

Figure 2:
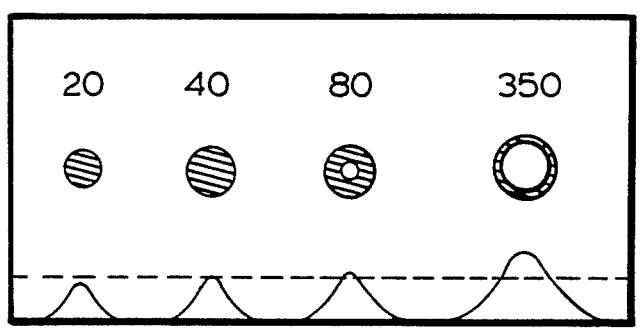
FIG. 2 illustrates an intensity profile for a silver sodalite in accordance with the present invention.

In silver carbonato-, hydroxy-, and to a lesser degree formato-sodalites the photochromic behavior was intensity dependent. The image produced on the sodalite can be correlated to the typical intensity profiles of the laser beam which follows a Gaussian distribution. The starting materials were white. In regions of low intensity the samples turned grey, while in those areas where a certain threshold intensity was exceeded, the grey spot was bleached to a lighter grey (hydroxide, formate) or yellow (carbonate). Circular patterns were thus created. FIG. 2 of the accompanying drawings illustrates typical such patterns. These are obtained by irradiation of the sample with an Ar$^+$ laser tuned to 351.1 nm. The beam power at the sample is given in mW. The gaussian distribution curves symbolize the energy distribution of the laser beam (not drawn to scale). Sample bleaching occurred where a minimum threshold intensity was exceeded. Bleached areas could not be re-marked. The energy distribution of the beam causes a temperature distribution on the sodalite. While all photons may be capable of darkening the silver sodalite, thermal erasure may occur in the hottest areas of the beam, resulting in the annular spot. For applications in an imaging system these silver sodalites can be used to create both a positive image by writing with low intensity laser light, or a negative image by writing with a high intensity beam and then developing the remaining area with lower intensity radiation.

EXAMPLE 6

Silver Oxalato-Sodalites

These were prepared by the silver exchange process described in example 2 using a precursor Na,Ox-SOD.

During the hydrothermal synthesis of the precursor Na,Ox-SOD, the oxalate concentration was difficult to control because of the low solubility of sodium oxalate in water (63.3 g/L @ 100° C.). The amount of oxalate present in solution was less than the stoichiometric amount necessary for occupation of every second cage, resulting in a product with high hydroxide and water content. In order to increase the oxalate content it appears that reducing the rate of crystallization, thereby allows more sodium oxalate to dissolve as anions are incorporated in the growing microcrystals.

Oxalates decompose by the following pathways:

$$C_2O_4{}^{2-} \xrightarrow{h\nu} 2\,CO_2 + 2\,e^- \text{ (photolytic decomposition)} \quad <I>$$

$$C_2O_4{}^{2-} \xrightarrow{\Delta} 2\,CO_2 + 2\,e^- \text{ (thermal decomposition)} \quad <II>$$

$$C_2O_4{}^{2-} \xrightarrow{\Delta} CO + CO_3{}^{2-} \text{ (thermal decomposition)} \quad <III>$$

Thus their intra-B-cage decomposition (I and II above) produces electrons, to effect reduction of the silver ion and form B-cage encapsulated zero or low valent silver metal atoms or clusters.

Mid-IR spectroscopy provides information about the internal modes of some encapsulated anions or molecules (e.g. water, oxalate). The mid-IR spectra confirmed the presence of oxalate in both the sodium and silver containing sodalites. At least two absorption peaks in the 1200–1700 cm$^{-1}$ region are attributed to oxalate vibrations. In partially dehydrated Na,Ox-SOD, these fall at 1580 and 1312 cm$^{-1}$. Based on studies of oxalate salts they may be assigned to the asymmetric O-C-O stretch, $\nu$ as(C-0), and the symmetric O-C-O stretch or the combination band $\nu$ s(C-O)+$\nu$ (O-C-O), respectively. In Ag,Ox-SOD, the absorptions occur at 1548 and 1293 cm$^{-1}$, respectively.

EXAMPLE 7

UV-Radiation of Silver-Oxalate Sodalite

The effects of UV-radiation were studied by exposing Ag,Ox-SOD to light produced by a Xe-lamp filtered with a 260–470 nm bandpass filter and water-IR filter. The mid-IR spectra of the sample was taken before and after 10 minute irradiation. While the change in the absorption spectra was small, a difference spectrum clearly indicated the loss of oxalate (1558, 1300 cm$^{-1}$) and some water (1628 cm$^{-1}$) with concomitant growth of a band at 1398 cm$^{-1}$. Corresponding far-IR spectra revealed essentially no changes upon irradiation. The UV-visible spectra of the same sample showed the growth of a band near 400 nm and several smaller bands at longer wavelengths which may be related to small silver clusters.

UV-photolysis of silver oxalate salts normally leads to the production of CO$_2$ and the reduction of silver. However, in the present case the wavelength of the irradiation source overlapped with certain absorption bands in the sodalite. As a result of this, some local heating could have resulted and produced thermal as well as photolytic effects. In a temperature programmed UV-visible study of Ag, Ox-SOD, the formation of new bands at ca. 400 nm and higher wavelengths did not occur until 170° C., a temperature never reached by the bulk of the samples under UV-irradiation. Local heating could have been higher.

EXAMPLE 8

Fluorescence of Silver Sodalites

Figure 3:
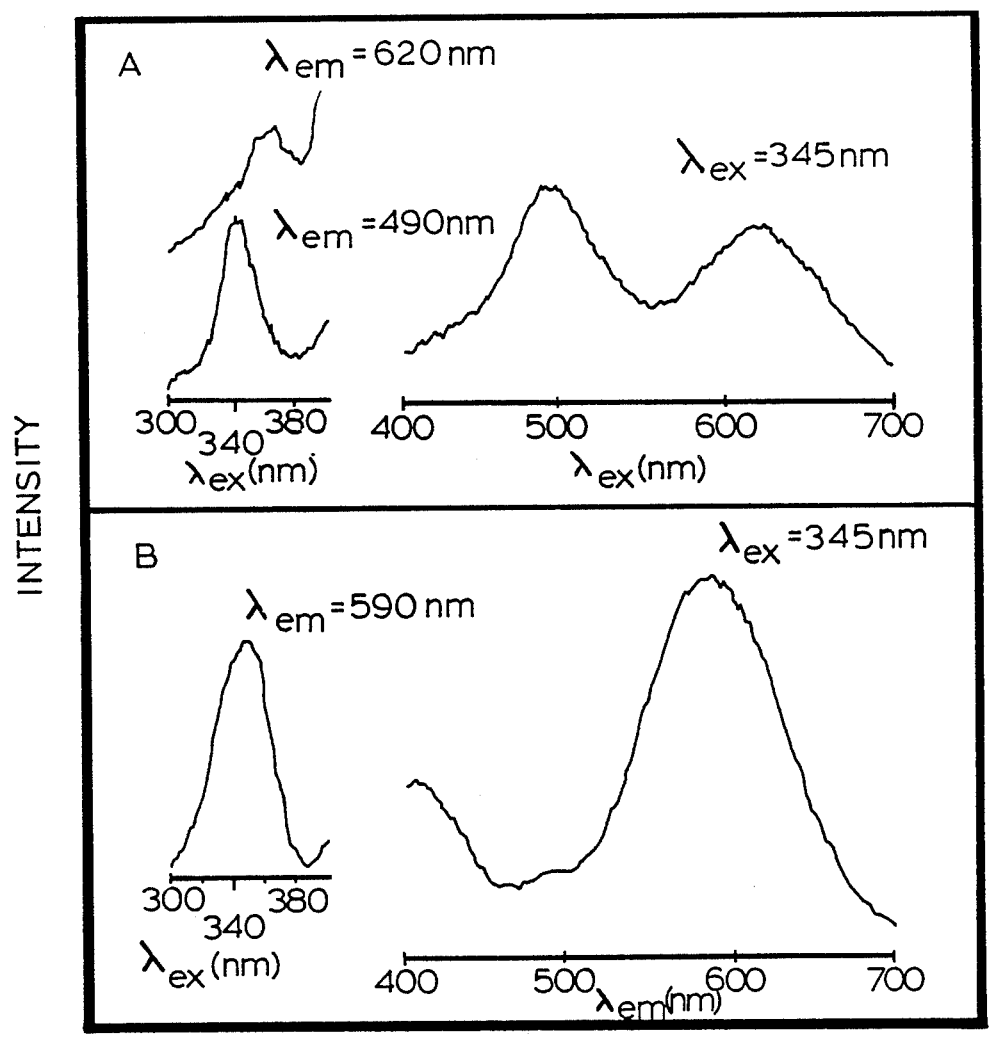
FIG. 3 illustrates fluorescence emission/excitation spectra of a silver sodalite in accordance with the present invention.

Silver oxalato-sodalites fluoresced with different colors or intensities, depending on the silver concentration and pretreatment, either as made by melt synthesis, or after thermal or photoactivation. Samples prepared by aqueous exchange did not fluoresce as synthesized. However, very short exposure to ultraviolet radiation (e.g. ca. 10 seconds exposure under a shortwave UV - 254 nm blacklight) activated the fluorescence. Typical excitation spectra of Ag,Oxaq-SOD (300–380 nm) and the corresponding emission spectra (400–700 nm) exhibited characteristic broad bands (full-width at half-height: ~0.3 eV). Such a spectrum is illustrated in FIG. 3 of the accompanying drawings, which shows, in its upper A-portion, the fluorescence emission/excitation spectra of Ag, Oxaq-SOD irradiated with UV light (450 W Xe-lamp, BG24 bandpass filter, 10 cm water filter) after 0.5 min. irradiation. The lower B-portion is the same spectrum after 10 hours irradiation. These spectra were obtained from fully exchanged silver oxalato-sodalites. There are many intrinsic reasons for the observation of broad excitation/emission bands in these spectral regions which relate to the nature of the ground and excited state potential energy surfaces. It is also possible that the individual emitting species occupy slightly different environments, similar to fluorescers in glassy materials (inhomogeneous line broadening). As FIG. 3 illustrates, the band structure changed as the sample was further irradiated with UV light from a 450 W Xe-lamp with 260–470 nm bandpass filter. Emission bands originally around 500 and 620 nm following 0.5 min exposure to irradiation appeared around 410 and 590 nm after 10 hours exposure to irradiation. The blue-green emission around 500 nm decreased significantly in intensity and a new band at 410 nm appeared. The latter overlaps with the absorption spectrum, and may give rise to energy transfer effects.

Figure 4A:
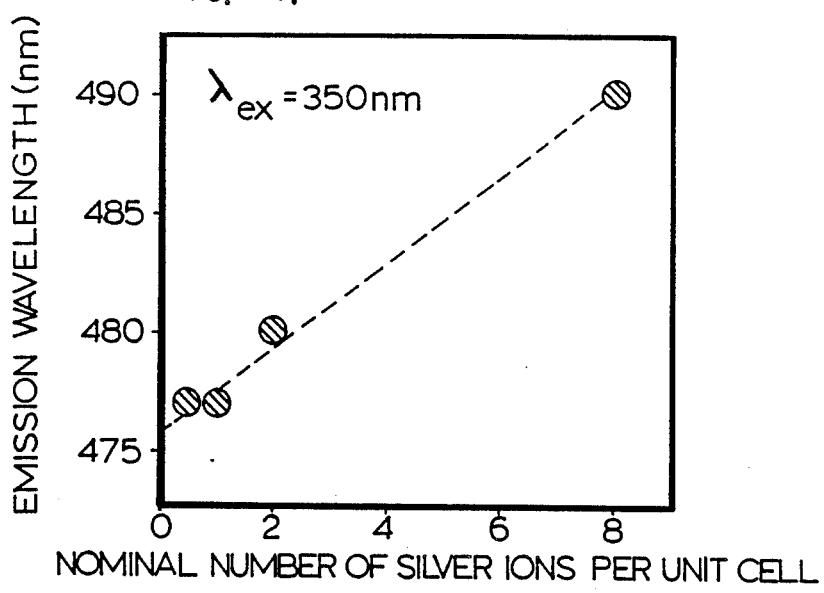
FIG. 4 illustrates silver concentration dependence observed for emission wavelength associated with fluorescence of silver sodalites in accordance with the present invention.
Figure 4B:
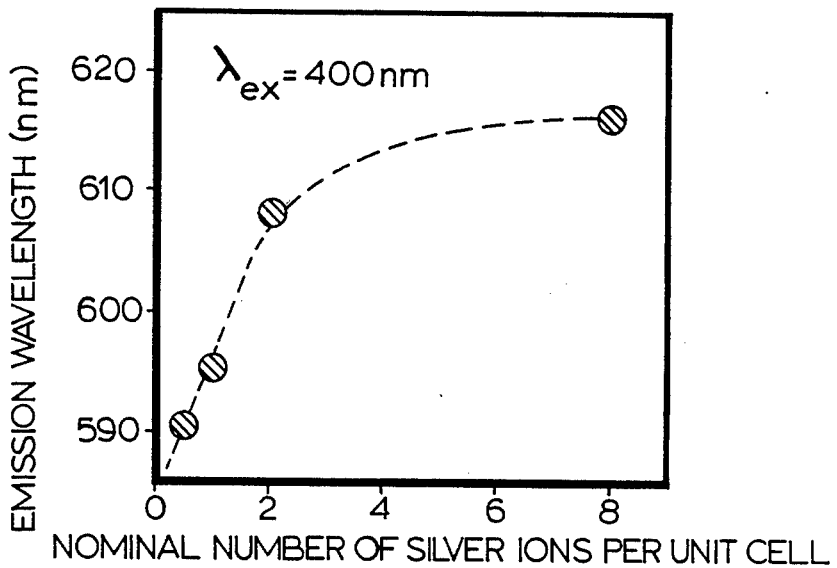

The fact that the samples had to be activated either by heat or UV-irradiation and such a process resulted in partial oxalate decomposition, suggests that some reduction of silver had to occur before the samples luminesced. The emission may be related to silver species such as reduced silver clusters. This hypothesis is supported by the silver concentration dependence observed for the emission wavelength. Pure Na,Ox-SOD did not fluoresce under any circumstances, even after activation by UV-light or by thermal treatment at temperatures at which the oxalate was known to decompose. In a series of melt exchanged Na,Ag,Ox-SOD samples the position of the most intense emission lines (475–490 nm, 590–620 nm) shifted to longer wavelengths as the silver concentration increased. This is illustrated in FIG. 4 of the accompanying drawings. The upper part of this figure is a plot of the emission wavelength for the most intense bands following excitation irradiation at wavelength 350 nm, against silver concentration. The lower part is a similar plot, pertaining to excitation at wavelength 400 nm.

Some preliminary luminescence lifetime measurements indicated that the orange fluorescence decays according to a double exponential function with a room temperature lifetime in the 100 microsecond region, which is much larger than that of silver atoms (around 10 nanoseconds), but not unusual for small, low nuclearity silver clusters in zeolites.

The fluorescence behavior of Na,Ag,Ox-SOD samples with low silver concentrations (0.5 Ag+/unit cell) containing some intact oxalate can be exploited for multiple write and erase applications.

EXAMPLE 9

Embedded Sodalites

The media prepared according to Example 4 were subjected to irradiation. The hard, highly transparent amorphous polymer poly(methylmethacrylate) (PMMA) was chosen because its refractive index matched that of sodalite very closely, so that light scattering was minimized. Depending on the mixing and the sodalite particle size, individual particles remained visible in most cases. Mixtures of PMMA with Na,Ag,SO$_x$-SOD, Na,Ag,Fo-SOD and Na,Ag,Ox-SOD, respectively, were prepared as films or on silica-quartz or glass slides and subjected to the laser-write and thermal erase cycles. Because of the lower sodalite concentration the fluorescence under a blacklight was weaker than in selfsupporting sodalite samples, but was still discernible. If the polymer was exposed to the laser beam too long, the intense beam caused some pitting of the polymer, or if no efficient heat sink was available (in the case of thicker or unsupported films) started to melt it. Insufficient curing of the polymer or excessive heat (>104° C.=glass temperature of PMMA) resulted in the formation of small bubbles during thermal erasing.

For higher contrast ratios (i.e. lower optical contact or if different physical properties of a support are required), other polymer supports can be selected. Non-organic supports may also be used. A thin film of sodalite grown on a single crystal quartz cut or similar material whose surface structure matches (epitaxy) that of the sodalite closely could be useful in certain applications. As an alternative, sodalite layers may be formed by settling the powder on glass supports from aqueous or organic suspensions in much the same manner as phosphor CRT screens are formed. Yet another option is to sandwich the powder between two transparent plates, possibly adding a refractive index matching compound to reduce scattering and increase light transmission if necessary.

REFERENCES

1. C. A. van Doorn, D. J. Schipper, *Phys Letters* 1971 34A, 139
2. I. Shidlovsky, I. Norwik, *Solid State Communications* 1976, 18, 155
3. W. Phillips, *J. Electrochem, Soc.: Solid State Science* 1970, 117, 1557
4. L. T. Todd, Jr., *J. Electrochem. Soc.: Solid State Science* 1978, 125, 1133
5. C. Z. van Doorn, D. J. Schipper, P. T. Bolwijn, *J. Electrochem. Soc.* 1972, 119, 85
6. I. F. Chang, *J. Electrochem. Soc.* 1974, 121 815
7. R. M. Barrer, D. E. W. Vaughan, *J. Phys. Chem Solids* 1971, 32, 731
8. R. M. Barrer, J. F. Cole, M. Sticher, *J. Chem. Soc. (A)*, 1968, 2475

We claim:

1. A silver sodalite material comprising a radiation sensitive silver composition entrapped within the cubooctahedral cavities of the sodalite framework, the silver component thereof being reducible with accompanying alteration of the optical properties thereof, with, the sodalite cavities on irradiation, said composition comprising at least one anion selected from the group consisting of oxalate, hydroxide, azide, carbonate, bicarbonte, sulfate, sulfite, chlorate, perchlorate, acetate and formate, the anion being in charge association with the silver.

2. The silver sodalite material of claim 1 wherein the silver component is reducible within the sodalite cavities to form zero-valent or low-valent silver metal clusters therein.

3. The silver sodalite material of claim 1 wherein the silver is reduced to form Ag$_4$ zero-valent or low-valent metal clusters in the sodalite cavities.

4. The silver sodalite material of claim 1 wherein the anion is selected from the group consisting of oxalate, formate, carbonate and bicarbonate.

5. The silver sodalite material of claim 1 wherein the anion is oxalate or formate.

6. The silver sodalite material of claim 1 wherein the silver composition within the cavities comprises silver cations essentially free from entrapped anions.

7. A silver sodalite material selected from the group consisting of silver oxalate sodalite, silver formato sodalite, sulfur-doped silver bromide sodalite, silver carbonate sodalite, and silver perchorate sodalite.

8. Silver oxalate sodalite.

9. A recording material sensitive to incident light radiation or to localized heating to form images of high resolution in response thereto, said recording material comprising (i) a thin layer of a light or heat sensitive silver sodalite material, said material comprising at least one anion selected from the group consisting of oxalate, hydroxide, azide, carbonate, bicarbonate, sulfate, sulfite, chlorate, perchlorate, acetate and formate, the anion being in charge association with the silver; and (ii) a support material for said sodalite material.

10. The recording material of claim 9 wherein the silver sodalite material is deposited as a thin film on a supporting substrate.

11. The recording material of claim 9 wherein the silver sodalite is embedded in a substantially inert and substantially incident light transparent matrix material.

12. The recording material of claim 11 wherein the matrix material is a thermoplastic polymer.

13. The recording material of claim 11 wherein the matrix material is poly(methylmethacrylate).

14. The recording material of claim 9 wherein the silver sodalite material comprises a light-sensitive or heat-sensitive silver-containing composition entrapped within the cubo-octahedral cavities of the sodalite framework, the silver component thereof being reducible within the sodalite cavities on irradiation with light or on heating to form zero-valent or low-valent silver metal clusters therein.

15. The recording material of claim 14 wherein the silver sodalite material is silver oxalato sodalite, silver formato sodalite, silver oxy-sulfur sodalite or partially-exchanged, sodium containing versions thereof.

16. A process of recording information encoded in an irradiation signal, which comprises directing said irradiation signal to become incident upon a recording material as claimed in claim 9.

17. The process of claim 16 wherein the irradiation signal is an optical irradiation signal and the recording material is optically sensitive.

* * * * *